US010625689B2

(12) United States Patent
Yang

(10) Patent No.: US 10,625,689 B2
(45) Date of Patent: Apr. 21, 2020

(54) STRUCTURE FOR MOUNTING A REAR VIEW CAMERA ON A VEHICLE

(71) Applicants: Warner Science Applications Corp., Ontario, CA (US); Paramount Automotive Restyling Inc., Ontario, CA (US)

(72) Inventor: Mingfa Yang, Calabasas, CA (US)

(73) Assignees: Warner Science Applications Corp., Ontario, CA (US); Paramount Automotive Restyling Inc., Ontario, CA (US)

(*) Notice: Subject to any disclaimer, the term of this patent is extended or adjusted under 35 U.S.C. 154(b) by 0 days.

(21) Appl. No.: 16/351,296

(22) Filed: Mar. 12, 2019

(65) Prior Publication Data

US 2019/0275958 A1    Sep. 12, 2019

Related U.S. Application Data

(60) Provisional application No. 62/641,979, filed on Mar. 12, 2018.

(51) Int. Cl.
*G03B 17/00*   (2006.01)
*B60R 11/04*   (2006.01)
*G03B 17/56*   (2006.01)
*B60R 11/00*   (2006.01)

(52) U.S. Cl.
CPC ............ *B60R 11/04* (2013.01); *G03B 17/561* (2013.01); *B60R 2011/004* (2013.01)

(58) Field of Classification Search
USPC .......................................... 396/419
See application file for complete search history.

(56) References Cited

U.S. PATENT DOCUMENTS

| | | | |
|---|---|---|---|
| 6,392,704 B1* | 5/2002 | Garcia-Ortiz | G08B 13/19619 340/937 |
| 7,883,064 B2* | 2/2011 | Luft | B60R 13/10 248/200 |
| 8,998,512 B1* | 4/2015 | Celler | G03B 17/561 396/427 |
| 9,150,165 B1* | 10/2015 | Fortin | B60R 11/04 |
| 2006/0061656 A1* | 3/2006 | Lang | B60R 1/12 348/148 |
| 2007/0237517 A1* | 10/2007 | Park | G03B 17/00 396/427 |

(Continued)

FOREIGN PATENT DOCUMENTS

JP    2010173542 A  *  8/2010

*Primary Examiner* — Rodney E Fuller
(74) *Attorney, Agent, or Firm* — Chen Yoshimura LLP

(57) ABSTRACT

A mounting structure for mounting a rear view camera on a vehicle includes a mounting bracket for mounting to the vehicle, a camera support structure mounted on a camera mounting plate of the bracket, where the camera support structure has a shaft that extends perpendicularly to the camera mounting plate, with a slanted surface at its distal end where the camera is mounted, and an outer housing that covers the camera mounting plate, the camera support structure, and the camera except for the camera lens. The outer housing has a portion that conforms to the shape of the shaft of the camera support structure, with an opening at its distal end to expose the camera lens.

2 Claims, 4 Drawing Sheets

(56) References Cited

U.S. PATENT DOCUMENTS

2008/0226282 A1\* 9/2008 Takahashi .............. F16M 11/10
  396/427
2017/0072856 A1\* 3/2017 Varick ................ G06K 9/00791
2018/0178723 A1\* 6/2018 Diaz ....................... B60R 11/04

\* cited by examiner

STRUCTURE FOR MOUNTING A REAR VIEW CAMERA ON A VEHICLE

BACKGROUND OF THE INVENTION

Field of the Invention

This invention relates to automobile parts, and in particular, it relates to a mounting structure for mounting a rear view camera onto a rear bumper of an automobile.

Description of Related Art

Built-in rear view cameras are common on vehicles. To enhance the exterior look of their vehicles, some vehicle owners install aftermarket parts such as rear bumpers with spare tire brackets, on their vehicle, which may interfere with the function of the built-in camera.

SUMMARY

Accordingly, embodiments of the present invention provides a housing for installing a rear facing camera located in the spare tire bracket of an aftermarket bumper.

A rear view camera assembly according to embodiments of the present invention includes: a mounting bracket including a first mounting plate and a second mounting plate, the second mounting plate being adapted for mounting the bracket to a part of a rear of a vehicle, the second mounting plate being parallel to the first mounting plate, and a connecting member that connects the first mounting plate and the second mounting plate; a camera support structure mounted on the first mounting plate, the camera support structure including a shaft that extends perpendicularly to the first mounting plate, the shaft having a slanted surface at its distal end, and an attachment structure for attaching the camera support structure to the first mounting plate; a camera disposed on the slanted surface of the shaft; and an outer housing disposed to cover the camera mounting plate and the camera support structure and a portion of the camera, the outer housing having a first portion that covers the first mounting plate and the attachment structure of the camera support structure, and a second portion which extends perpendicular to the first portion and has a shape that conforms to a shape of the shaft of the camera support structure, with an opening at a distal end of the second portion, where a lens of the camera is exposed by the opening.

DETAILED DESCRIPTION OF PREFERRED EMBODIMENTS

Figure 1:
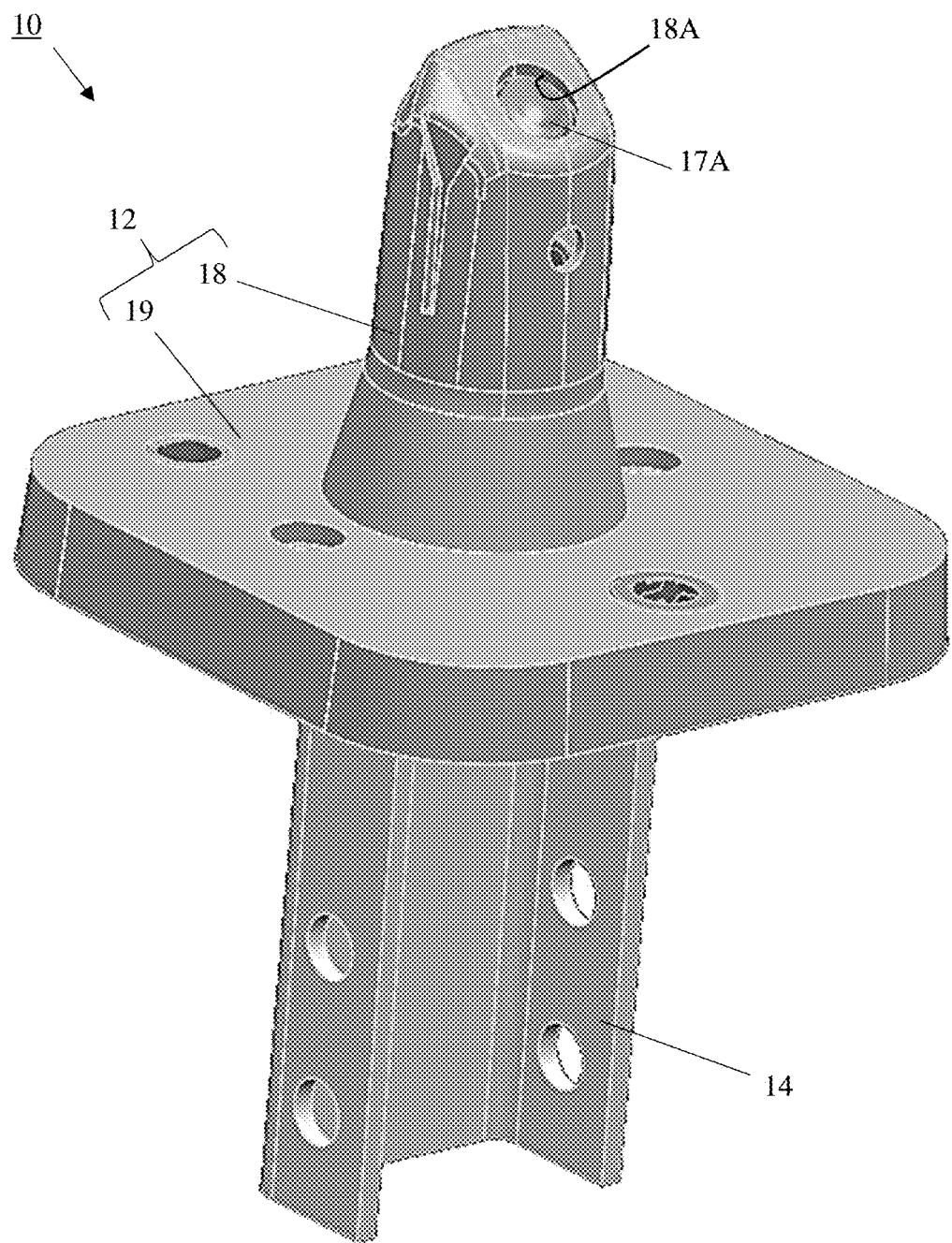
FIGS. 1 and 2 illustrate a mounting structure for mounting a rear view camera onto a vehicle.
Figure 2:
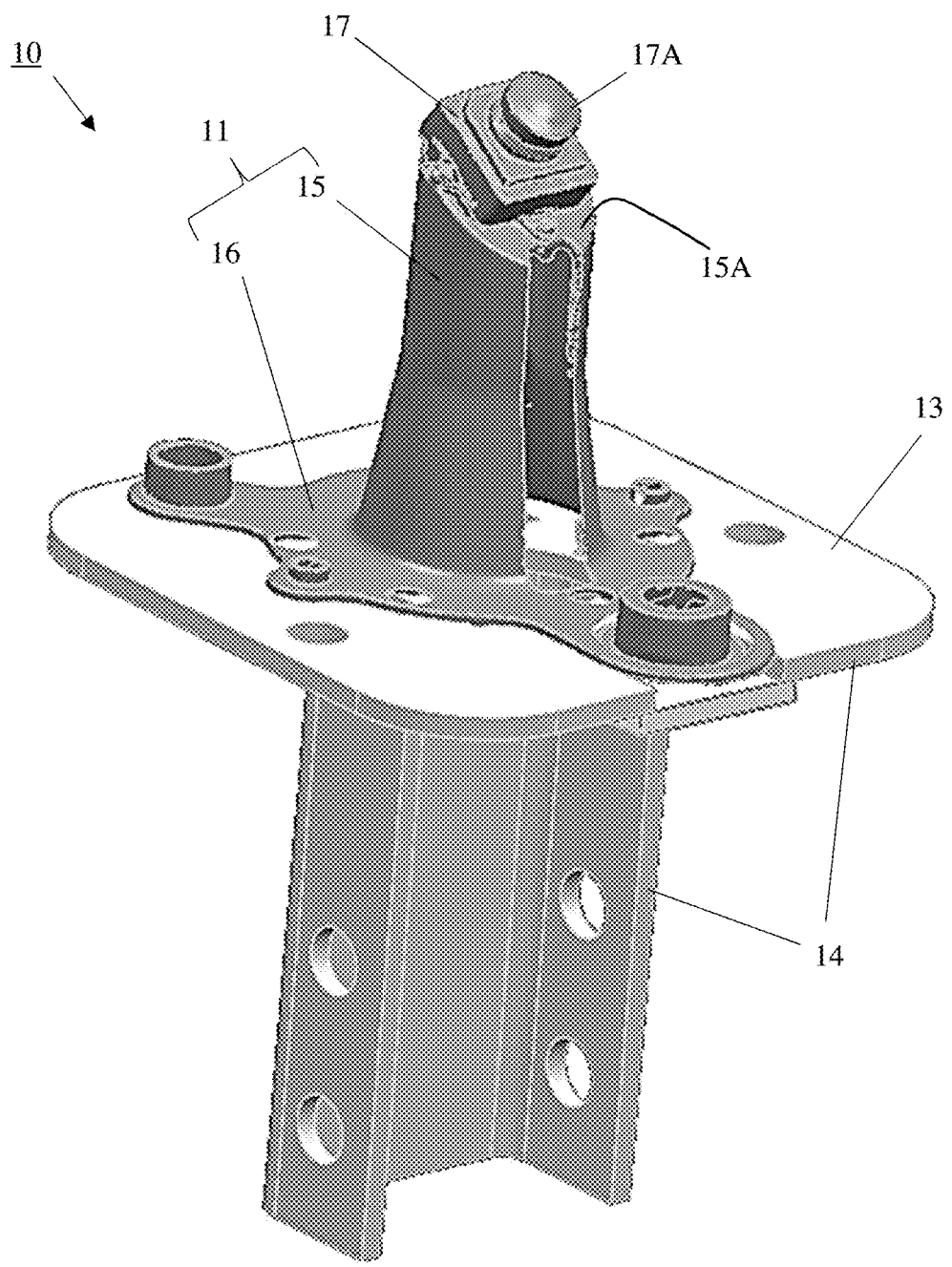

Referring to FIGS. 1 and 2, the mounting structure 10 includes a camera support structure (an inner housing) 11 and an outer housing (a cover) 12. The camera support structure and the outer housing are mounted onto a mounting plate 13 of a mounting bracket 14. The camera support structure 11 has a shaft or finger 15 that extends perpendicularly from the plate 13, with a slanted surface 15A at its distal end, and an attachment structure 16 including plates and screws for attaching the camera support structure to the plate 13. The camera 17 is mounted on the slanted surface 15A. The mounting plate 13, the camera support structure 11 and the camera 17, except for the camera lenses 17A, are covered by the outer housing 12. The upper portion 18 of outer housing 12 has a shape that substantially conforms to the shape of the shaft 15 of the camera support structure 11, including an opening 18A at its distal end for exposing the camera lens 17A. The lower portion or base 19 of the outer housing 12 has a shape that covers the mounting plate 13 and the mounting structure 16 of the camera support structure 11.

Figure 3:
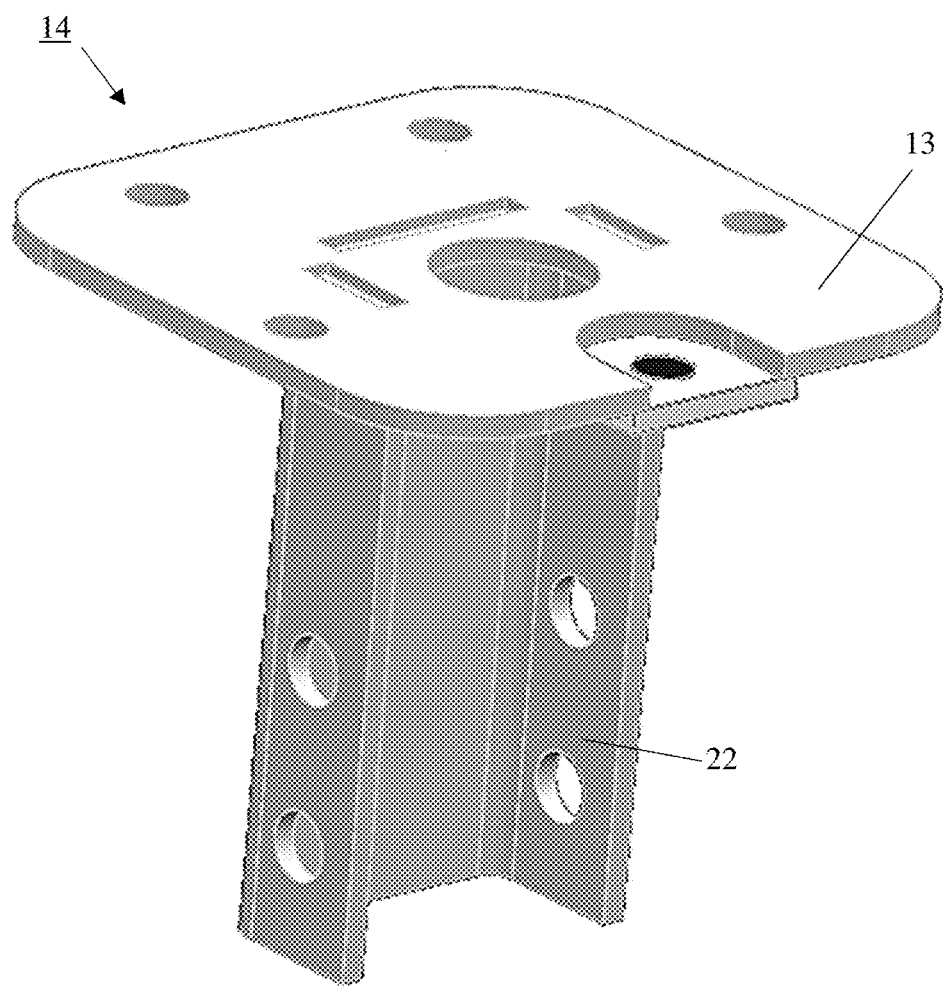
FIG. 3 illustrates a part of the mounting bracket onto which the inner and outer camera housings are mounted.
Figure 4:
FIG. 4 illustrate the mounting bracket mounted on a tire carrier of the vehicle.

Referring to FIGS. 3 and 4, the mounting bracket 14 has a camera mounting plate 13 on which the camera support structure 11 and the outer housing 12 can be mounted, a carrier mounting plate 21 (not shown in FIG. 3) for mounting the bracket 14 to a part of the rear of the vehicle such as a tire carrier, the carrier mounting plate being substantially parallel to the camera mounting plate, and a connecting part 22 (not visible in FIG. 4) that connect the two plates.

When the mounting structure 10 is mounted on the vehicle, the shaft 15 of the camera support structure and the upper portion 18 of the outer housing extend substantially horizontally, and the camera 17 (i.e. lens 17A) faces a direction that is rearward and downward, in a direction determined by the slanted surface 15A. The length of the shaft 15 and the angle of the slanted surface 15A are designed to position the camera at an ideal angle and depth for an optimum view of the rear area of the vehicle for the driver.

The bracket 14 allows for mounting a large tire onto the tire carrier and still using the rear facing camera. This is achieved by having paired holes in the carrier mounting plate 21 of the bracket 14 which correspond to paired holes in the tire carrier. In some vehicles, the tire carrier has two columns of such holes, which allow the bracket 14 to be positioned along different vertical positions of the tire carrier to permit mounting of larger tires so they do not hit the top edge of the bumper.

It will be apparent to those skilled in the art that various modification and variations can be made in the rear view camera mounting structure of the present invention without departing from the spirit or scope of the invention. Thus, it is intended that the present invention cover modifications and variations that come within the scope of the appended claims and their equivalents.

What is claimed is:

1. A mounting structure for mounting a rear view camera on a vehicle, comprising:
   a mounting bracket including a first mounting plate having a flat plat shape extending in a transverse direction and a second mounting plate having a flat plat shape extending in the transverse direction, the second mounting plate having a plurality of holes, the second mounting plate being parallel to the first mounting plate, and a connecting member that connects the first mounting plate and the second mounting plate, the connecting member extending between the first and second mounting plates in a longitudinal direction which is perpendicular to the transverse direction to define a space between the first and second mounting plates, wherein the plurality of holes of the second mounting plate are exposed to the space;
   a camera support structure mounted on the first mounting plate, the camera support structure including a shaft that extends in the longitudinal direction perpendicularly to the first mounting plate, the shaft having a slanted surface at its distal end adapted for mounting the camera, and an attachment structure for attaching the camera support structure to the first mounting plate; and an outer housing disposed to cover the camera mounting plate and the camera support structure and a portion of the camera, the outer housing having a first portion that covers the first mounting plate and the attachment structure of the camera support structure, and a second portion which extends in the longitudinal direction perpendicular to the first portion and has a shape that conforms to a shape of the shaft of the camera support structure, with an opening at a distal end of the second portion, the second portion of the outer housing having a transverse dimension that is smaller than a transverse dimension of the first portion of the outer housing.

2. A rear view camera assembly for a vehicle, comprising:

a mounting bracket including a first mounting plate having a flat plat shape extending in a transverse direction and a second mounting plate having a flat plat shape extending in the transverse direction, the second mounting plate having a plurality of holes, the second mounting plate being parallel to the first mounting plate, and a connecting member that connects the first mounting plate and the second mounting plate, the connecting member extending between the first and second mounting plates in a longitudinal direction which is perpendicular to the transverse direction to define a space between the first and second mounting plates, wherein the plurality of holes of the second mounting plate are exposed to the space;

a camera support structure mounted on the first mounting plate, the camera support structure including a shaft that extends in the longitudinal direction perpendicularly to the first mounting plate, the shaft having a slanted surface at its distal end, and an attachment structure for attaching the camera support structure to the first mounting plate;

a camera disposed on the slanted surface of the shaft; and an outer housing disposed to cover the camera mounting plate and the camera support structure and a portion of the camera, the outer housing having a first portion that covers the first mounting plate and the attachment structure of the camera support structure, and a second portion which extends perpendicular to the first portion and has a shape that conforms to a shape of the shaft of the camera support structure, with an opening at a distal end of the second portion, wherein a lens of the camera is exposed by the opening, the second portion of the outer housing having a transverse dimension that is smaller than a transverse dimension of the first portion of the outer housing.

\* \* \* \* \*